United States Patent
Zhu et al.

(10) Patent No.: US 11,935,167 B2
(45) Date of Patent: Mar. 19, 2024

(54) METHOD AND APPARATUS FOR VIRTUAL FITTING

(71) Applicants: Beijing Jingdong Shangke Information Technology Co., Ltd., Beijing (CN); Beijing Jingdong Century Trading Co., Ltd., Beijing (CN)

(72) Inventors: Junwei Zhu, Beijing (CN); Zhidong She, Beijing (CN); Zhentao Zhang, Beijing (CN)

(73) Assignees: RELING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 162 days.

(21) Appl. No.: 17/622,266

(22) PCT Filed: Mar. 26, 2020

(86) PCT No.: PCT/CN2020/081322
§ 371 (c)(1),
(2) Date: Dec. 23, 2021

(87) PCT Pub. No.: WO2021/008166
PCT Pub. Date: Jan. 21, 2021

(65) Prior Publication Data
US 2022/0245876 A1    Aug. 4, 2022

(30) Foreign Application Priority Data

Jul. 17, 2019 (CN) .......................... 201910645913.1

(51) Int. Cl.
*G06T 11/60* (2006.01)
*G06T 7/11* (2017.01)
(Continued)

(52) U.S. Cl.
CPC ............... *G06T 11/60* (2013.01); *G06T 7/11* (2017.01); *G06T 7/70* (2017.01); *G06V 10/774* (2022.01);
(Continued)

(58) Field of Classification Search
None
See application file for complete search history.

(56) References Cited

U.S. PATENT DOCUMENTS

2017/0352092 A1    12/2017    Mitchell et al.

FOREIGN PATENT DOCUMENTS

CN    102509349 A    6/2012
CN    102982581 A    3/2013
(Continued)

OTHER PUBLICATIONS

Wu et al. "M2M-Try On Net: Fashion from Model to Everyone", Conference'17, Jul. 2017, Washington, DC, USA (Year: 2017).*
(Continued)

*Primary Examiner* — Yingchun He
(74) *Attorney, Agent, or Firm* — Blank Rome LLP

(57) ABSTRACT

Disclosed in embodiments of the present disclosure are a method and apparatus for virtual fitting. A specific implementation of the method comprises: receiving a fitting request comprising a model picture and a user image; performing human body positioning and surface coordinate analysis on the model picture and the user image respectively; performing clothing segmentation on the model picture and the user image respectively; on the basis of the clothing segmentation result and the surface coordinate analysis result, covering the pixels corresponding to a piece of clothing in the model picture to corresponding positions in the user image to obtain a synthesized image and information to be completed; and inputting the synthesized
(Continued)

image, the positioning result of the user image, and said information into a pre-trained image completion network to obtain a completed image.

15 Claims, 6 Drawing Sheets

(51) Int. Cl.
*G06T 7/70* (2017.01)
*G06V 10/774* (2022.01)
*G06V 10/82* (2022.01)

(52) U.S. Cl.
CPC .... *G06V 10/82* (2022.01); *G06T 2207/20081* (2013.01); *G06T 2207/20084* (2013.01); *G06T 2207/20221* (2013.01); *G06T 2207/30196* (2013.01); *G06T 2210/16* (2013.01)

(56) References Cited

FOREIGN PATENT DOCUMENTS

| | | |
|---|---|---|
| CN | 107403351 A | 11/2017 |
| CN | 107578305 A | 1/2018 |
| CN | 107622428 A | 1/2018 |
| CN | 107798713 A | 3/2018 |
| CN | 108510594 A | 9/2018 |
| CN | 108734787 A | 11/2018 |
| CN | 108765295 A | 11/2018 |
| CN | 108876936 A | 11/2018 |
| CN | 108932693 A | 12/2018 |
| CN | 109559287 A | 4/2019 |
| CN | 109740529 A | 5/2019 |
| CN | 109801380 A | 5/2019 |
| CN | 109934935 A | 6/2019 |
| JP | 2003085411 A | 3/2003 |
| WO | WO-2017/027294 A1 | 2/2017 |

OTHER PUBLICATIONS

Güler et al. "DensePose: Dense Human Pose Estimation In The Wild", arXiv preprint arXiv:1802.00434 2018 (Year: 2018).*
International Search Report for PCT/CN2020/081322, dated Jun. 16, 2020, 2 pgs.
Z. Wu, et al., "M2E-Try On Net: Fashion from Model to Everyone", Association for Computing Machinery, 2018, 9 pgs.
X. Han, et al., "Viton: An Image-Based Virtual Try-On Network", 2018 IEEE/CVF Conference on Computer Vision and Pattern Recognition, IEEE Computer Society, 2018, 10 pgs.

* cited by examiner ized for experiments at small image resolutions and is not practical temporarily. At present, the generation technology of the 2D image-based virtual fittings generally performs poorly in detail such as human hands.

METHOD AND APPARATUS FOR VIRTUAL FITTING

The present application is a national stage of International Application No. PCT/CN2020/081322, filed on Mar. 26, 2020, which claims the priority of Chinese Patent Application No. 201910645913.1, titled "METHOD AND APPARATUS FOR VIRTUAL FITTING", filed on Jul. 17, 2019. Both of the aforementioned applications are hereby incorporated by reference in their entireties.

TECHNICAL FIELD

Embodiments of the present disclosure relate to the technical field of computer, and particularly to a method and apparatus for virtual fitting.

BACKGROUND

In the field of e-commerce, users generally can only see the displays from the sellers when purchasing clothing, and cannot know the actual appearances when they try the clothing on. This greatly affects the user experiences and can also cause a number of practical problems. For example, the buyers return or exchange the items due to mismatches with expectations. Thus, the virtual fitting technology has been paid more attention. With this technology, users can conveniently view the effects of they trying the clothing on. In addition to the virtual fitting rooms for the e-commerce, this technology can provide services for image editing software or be used as an entertainment technology.

There are two main implementations of virtual fittings at present: 3D modeling-based virtual fittings and 2D image-based virtual fittings. The 3D virtual fittings require acquiring 3D information of human bodies and clothing, and then performing patch synthesis according to target people, which can realize displays at any angles, but generally the devices are expensive and the effects are different from that of daily images. Acquiring 3D information of the human bodies and the clothing is generally costly and cumbersome. The 2D image-based virtual fittings, emerging in recent years, use pure images to synthesize the target images. However, such technology is now commonly used for experiments at small image resolutions and is not practical temporarily. At present, the generation technology of the 2D image-based virtual fittings generally performs poorly in detail such as human hands.

SUMMARY

Embodiments of the present disclosure provide a method and apparatus for visual fitting.

In a first aspect, embodiments of the present disclosure provide a method for a visual fitting, which includes: receiving a fitting request including a model picture and a user image; performing human body positioning analysis and surface coordinate analysis on the model picture and the user image respectively; performing clothing segmentation on the model picture and the user image respectively; covering, based on results of the clothing segmentation and results of the surface coordinate analysis, pixels corresponding to a piece of clothing in the model picture to corresponding positions in the user image to obtain a synthesized image and to-be-completed information; and inputting the synthesized image, a result of the human body positioning analysis on the user image and the to-be-completed information into a pre-trained image completion network to obtain a completed image.

In some embodiments, the method further includes: fusing a result of clothing analysis on the user image with the completed image to obtain a fused image.

In some embodiments, the method further includes: embedding, based on a result of the human body positioning analysis on the user image, the fused image into the original user image for outputting.

In some embodiments, the fitting request further includes a type of a target piece of clothing, and before the covering pixels corresponding to a piece of clothing in the model picture to corresponding positions in the user image, the method further includes: determining, based on the type of the target piece of clothing and a result of the human body positioning analysis on the user image, a to-be-erased area in the user image; and erasing, based on the to-be-erased area, a part in the user image, the part being probably covered by the target piece of clothing.

In some embodiments, the image completion network is trained through following steps of: acquiring a sample image set; for a sample image in the sample image set, erasing a part in the sample image randomly, the part being probably covered by a piece of clothing, to obtain to-be-completed information of the sample image; for the sample image in the sample image set, performing the human body positioning analysis on the sample image to obtain posture information in the sample image; and using an image obtained after the erasing, the to-be-completed information of the sample image, and the posture information in the sample image in the sample image set as inputs, and using the sample image before the erasing as an output, to perform a machine learning training to obtain the image completion network.

In some embodiments, the image completion network includes: a generation network and a discriminant network, the generation network includes a gated convolution layer, a residual block, a self-attention layer, and a transposed convolution layer, and the discriminant network includes a spectral normalization convolution layer.

In a second aspect, embodiments of the present disclosure provide an apparatus for visual fitting, which includes: a receiving unit, configured to receive a fitting request including a model picture and a user image; a positioning unit, configured to perform human body positioning analysis and surface coordinate analysis on the model picture and the user image respectively; a segmenting unit, configured to perform clothing segmentation on the model picture and the user image respectively; a synthesizing unit, configured to cover, based on results of the clothing segmentation and results of the surface coordinate analysis, pixels corresponding to a piece of clothing in the model picture to corresponding positions in the user image to obtain a synthesized image and to-be-completed information; and a completing unit, configured to input the synthesized image, a result of the human body positioning analysis on the user image and the to-be-completed information into a pre-trained image completion network to obtain a completed image.

In some embodiments, the apparatus further includes a fusing unit, configured to fuse a result of clothing analysis on the user image with the completed image to obtain a fused image.

In some embodiments, the apparatus further includes an output unit, configured to embed, based on a result of the human body positioning analysis on the user image, the fused image into the original user image for outputting.

In some embodiments, the fitting request further includes a type of a target piece of clothing, and the apparatus further includes an erasing unit, configured to: determine, based on the type of the target piece of clothing and a result of the human body positioning analysis on the user image, a to-be-erased area in the user image, before covering the pixels corresponding to the piece of clothing in the model picture to the corresponding positions in the user image; and erase, based on the to-be-erased area, a part in the user image, the part being probably covered by the target piece of clothing.

In some embodiments, the apparatus further includes a training unit, configured to: acquire a sample image set; for a sample image in the sample image set, erase a part in the sample image randomly, the part being probably covered by a piece of clothing, to obtain to-be-completed information of the sample image; for the sample image in the sample image set, perform the human body positioning analysis on the sample image to obtain posture information in the sample image; and use an image obtained after the erasing, the to-be-completed information in the sample image, and the posture information in the sample image in the sample image set as inputs, and use the sample image before the erasing as an output, to perform a machine learning training to obtain the image completion network.

In some embodiments, the image completion network includes: a generation network and a discriminant network, the generation network includes a gated convolution layer, a residual block, a self-attention layer, and a transposed convolution layer, and the discriminant network includes a spectral normalization convolution layer.

In a third aspect, embodiments of the present disclosure provide an electronic device, which includes: one or more processors; and a storage apparatus storing one or more programs thereon, where the one or more programs, when executed by the one or more processors, cause the one or more processors to implement the method as described in any of embodiments of the first aspect.

In a fourth aspect, embodiments of the present disclosure provide a computer-readable medium storing a computer program thereon, where the program, when executed by a processor, implements the method as described in any of the embodiments of the first aspect.

According to the method and apparatus for a virtual fitting provided in the embodiments of the present disclosure, compared with 3D modeling-based virtual fittings, 2D image-based virtual fittings has the advantages such as low cost, concise processes, broad coverage on clothing categories, and the generated image is more like a daily photo; compared with present 2D image-based virtual fittings, has the advantages such as supporting any image resolution and better expression ability on fine body details.

BRIEF DESCRIPTION OF THE DRAWINGS

By reading the detailed description of non-limiting embodiments with reference to the following accompanying drawings, other features, objects and advantages of the present disclosure will become more apparent.

DETAILED DESCRIPTION OF EMBODIMENTS

Embodiments of the present disclosure will be further described below in detail in combination with the accompanying drawings. It should be appreciated that detailed embodiments described herein are merely used for explaining the relevant invention, rather than limiting the invention. In addition, it should be noted that, for the ease of description, only the parts related to the relevant invention are shown in the accompanying drawings.

It should be noted that embodiments in the present disclosure and the features in embodiments may be combined with each other on a non-conflict basis. Embodiments of the present disclosure will be described below in detail with reference to the accompanying drawings.

Figure 1:
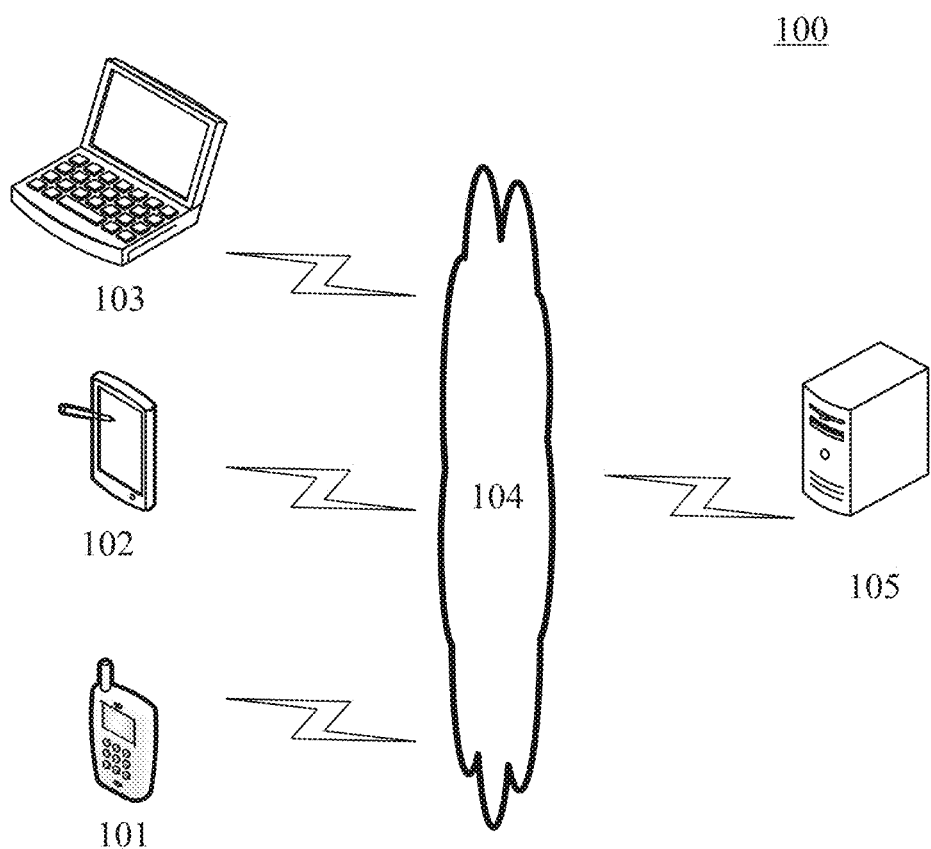
FIG. 1 is an example system architecture to which an embodiment of the present disclosure may be applied.

FIG. 1 shows an example architecture 100 to which a method or apparatus for a visual fitting according to an embodiment of the present disclosure may be applied.

As shown in FIG. 1, the system architecture 100 may include terminal device(s) 101, 102, 103, a network 104 and a server 105. The network 104 serves as a medium for providing a communication link between the terminal device(s) 101, 102, 103 and the server 105. The network 104 may include various types of connections, such as wired or wireless communication links, or optical fiber cables.

A user may use the terminal device(s) 101, 102, 103 to interact with the server 105 through the network 104 to receive or send messages. Various communication client applications, such as visual fitting applications, web browser applications, shopping applications, search applications, instant messaging tools, email clients, social platform software, may be installed on the terminal device(s) 101, 102, 103.

The terminal device(s) 101, 102, 103 may be various electronic devices having a display screen and supporting web browsing, including but not limited to, a smart phone, a tablet computer, an electronic book reader, an MP3 player (Moving Picture Experts Group Audio Layer III), an MP4 player (Moving Picture Experts Group Audio Layer IV), a laptop portable computer and a desktop computer.

The server 105 may be a server providing various services, such as a background server of a visual fitting providing support for a visual fitting webpage displayed on the terminal device(s) 101, 102, 103. The background server of the visual fitting may perform analysis processing on received data, such as a fitting request, and feedback a processing result (such as an effect diagram of a visual fitting) to the terminal devices.

It should be noted that the method for a virtual fitting provided by the embodiments of the present disclosure is generally executed by the server 105.

Correspondingly, the apparatus for a virtual fitting is generally provided in the server 105.

It should be appreciated that the number of the terminal devices, the network and the server in FIG. 1 is merely illustrative. Any number of terminal devices, networks and servers may be provided according to actual requirements.

Figure 2:
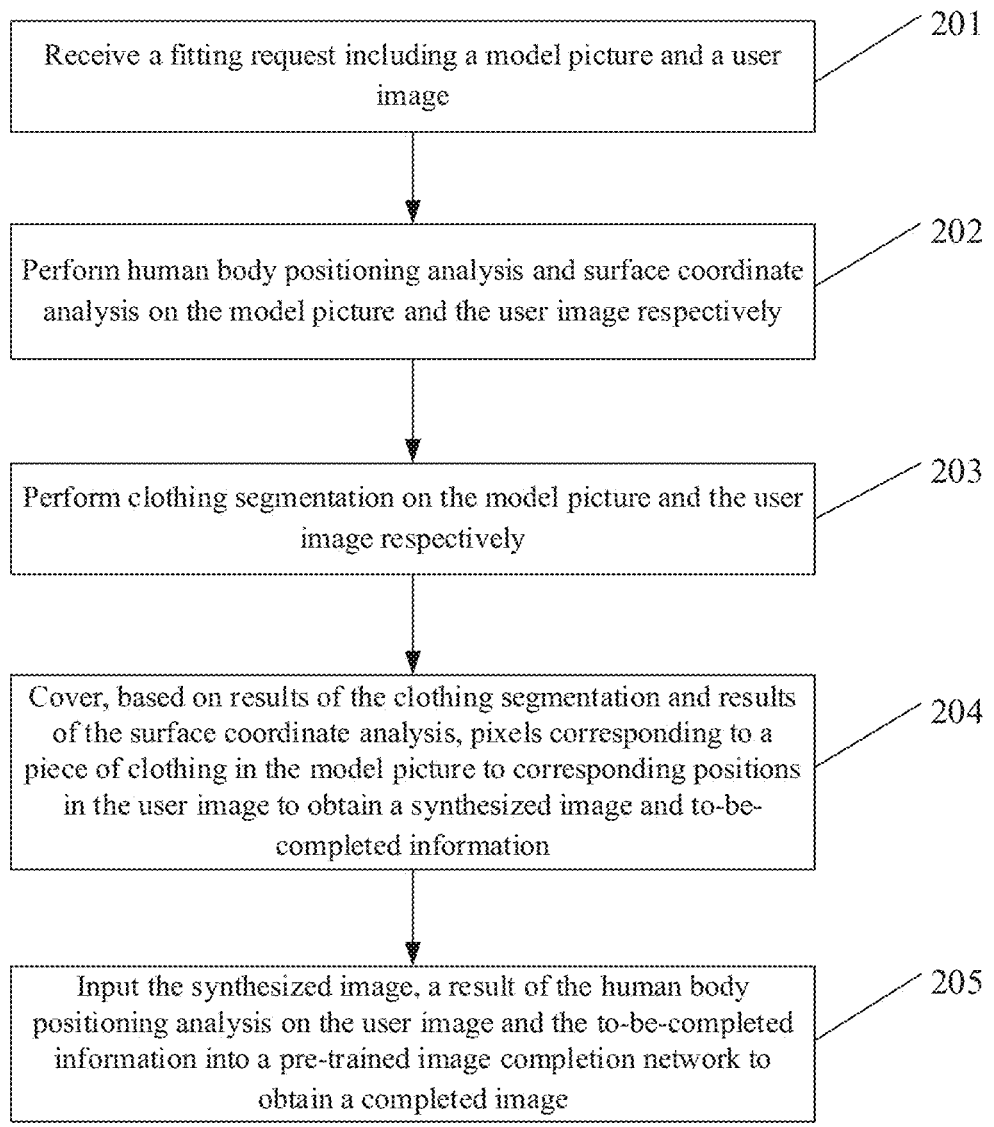
FIG. 2 is a flowchart of a method for a virtual fitting according to an embodiment of the present disclosure.

Further referring to FIG. 2, FIG. 2 shows a flow 200 of a method for virtual fitting according to an embodiment of the present disclosure. The method for a virtual fitting includes steps 201 to 205.

Step 201, receiving a fitting request including a model picture and a user image.

In this embodiment, an execution body of the method for virtual fitting (such as the server 105 shown in FIG. 1) may receive, through a wired or wireless connection, the fitting request from a terminal using which a user performs visual fitting. The fitting request includes the model picture and the user image. The user image (or a video, the video will be processed frame by frame according to a process of an image) is selected as Image1, and the model picture corresponding to a piece of clothing that the user wants to try on is selected as Image2.

Step 202, performing human body positioning analysis and surface coordinate analysis on the model picture and the user image respectively.

In this embodiment, the human body positioning analysis and the surface coordinate analysis are performed on the pictures in step 201 respectively, so that to obtain the human body positioning result and the surface coordinates of the model picture and the human body positioning result and the surface coordinates of the user image respectively. The body posture of the user, such the right arm being bent to pinch the waist and the left arm being drooped, can be determined through the human body positioning result. Herein, a densepose algorithm is used, which divides a human body into 24 parts, each part having a corresponding UV coordinate, and this coordinate information may be used to transfer surface texture as shown in FIG. 3B. Alternatively, other algorithms may be used for performing the human body positioning analysis and the surface coordinate analysis. Alternatively, a human body may be divided into more parts as required, thereby reflecting more details.

Step 203, performing clothing segmentation on the model picture and the user image respectively.

In this embodiment, the clothing segmentation may be performed on the model picture whose clothing interests the user in the model picture, and a person in the user image who is going to try the clothing on respectively, by using the Context Embedding with Edge Perceiving (CE2P) algorithm. To accommodate the fitting task, we divided a two-dimensional human body image into 19 categories: a hat, a pair of gloves, a pair of glasses, a blouse, a dress, a coat, a pair of socks, a pair of pants, a scarf, a skirt, a left shoe, a right shoe, hair, a face, a neck, a left hand, a right hand, a left leg, and a right leg. Other pixels are all classified into a background category. The algorithm classifies clothes into a number of clothing categories to facilitate selection of a different clothing category for transfer, and also includes exposed parts of a human skin, and segmenting pixels of these human parts helps restore details of the human body in the user images.

Step 204, covering, based on results of the clothing segmentation and results of the surface coordinate analysis, pixels corresponding to a piece of clothing in the model picture to corresponding positions in the user image to obtain a synthesized image and to-be-completed information.

In this embodiment, during selecting a piece of clothing for texture transfer, a segmentation result (obtained by the CE2P algorithm) corresponding to the piece of clothing in the model picture is selected, and in combination with the surface coordinate information obtained by the densepose algorithm, the pixels corresponding to the piece of clothing are covered to the corresponding positions in the user image. At the same time, since the task postures in the model picture and the user image are usually different, the original clothes in the original model picture and the user image may be not the same (for example, one is a short sleeve and the other is a long sleeve), and the exposed parts of the model and person in the two 2D images are also different, the clothing texture cannot be completely and correspondingly transferred. In order to make the final synthesized image as true as possible, before this step of transferring the clothing texture, we need to erase pixels corresponding to a piece of clothing in the user image, and at the same time, erase parts that may be covered by the new piece of clothing (for example, when a blouse is changed, an exposed arm of the person in the user image will be erased). If the texture transferred from the model picture is not enough to cover all the erased pixels, a defect area will appear, thereby obtaining the to-be-completed information.

In some alternative implementations of this embodiment, the fitting request further includes a type of a target piece of clothing, and before the covering pixels corresponding to a piece of clothing in the model picture to the corresponding positions in the user image, the method further includes: determining, based on the type of the target piece of clothing and a result of the human body positioning analysis on the user image, a to-be-erased area in the user image; and erasing, based on the to-be-erased area, a part in the user image, the part being probably covered by the target piece of clothing. For example, the to-be-erased area is the upper part of the person in the user image when a blouse is to-be-changed, and after the upper part of the person in the user image is erased, the texture of the blouse in the model picture is transferred to the upper part of the person in the user image. Since the image after the transfer may be not complete, defect pixels in the user image may be determined based on information such as the positioning information and the erased area. These defect pixels constitute "mask", which is used to mark which position of the user image needs to be completed.

Step 205, inputting the synthesized image, a result of the human body positioning analysis on the user image and the to-be-completed information into a pre-trained image completion network to obtain a completed image.

Figure 3A:
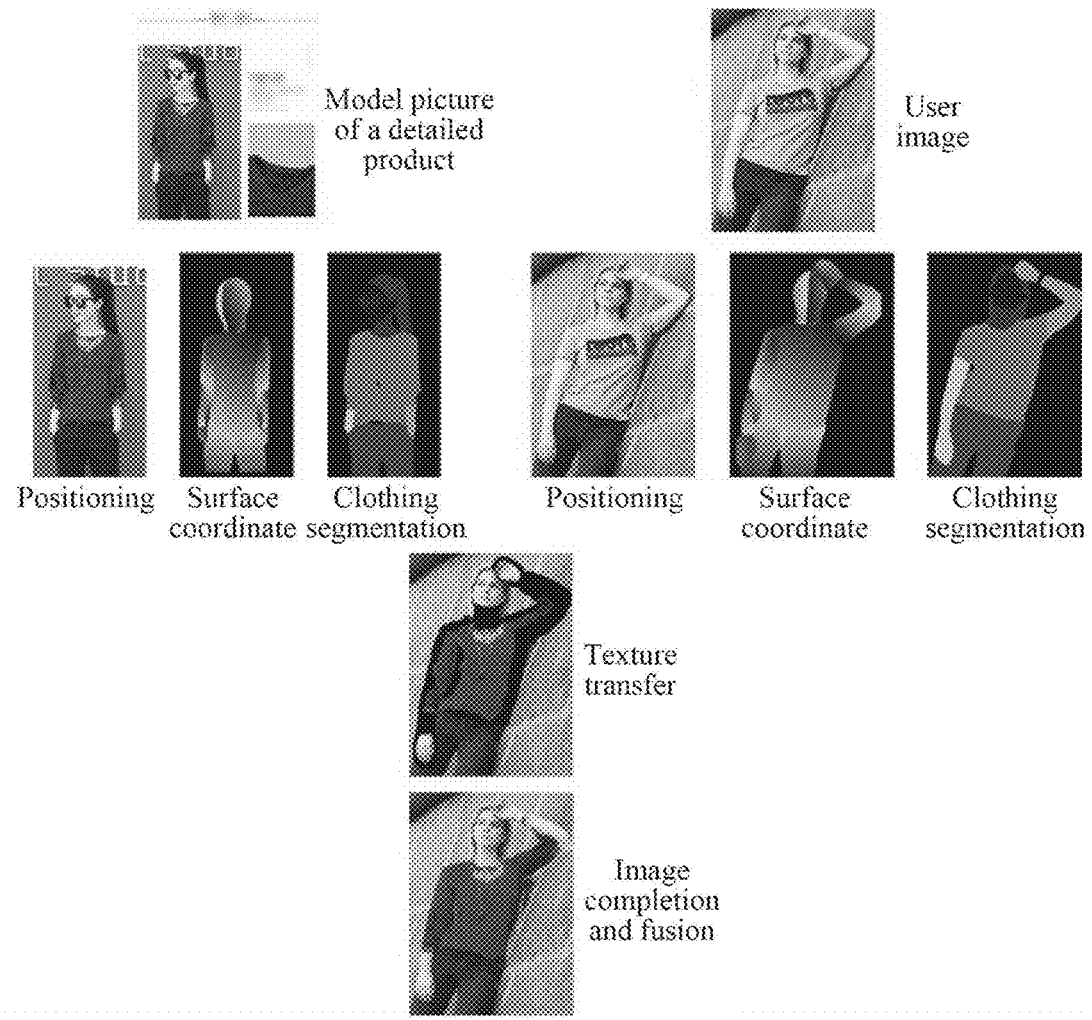
FIGS. 3A and 3B are schematic diagrams of an application scenario of the method for a virtual fitting according to an embodiment of the present disclosure.
Figure 3B:
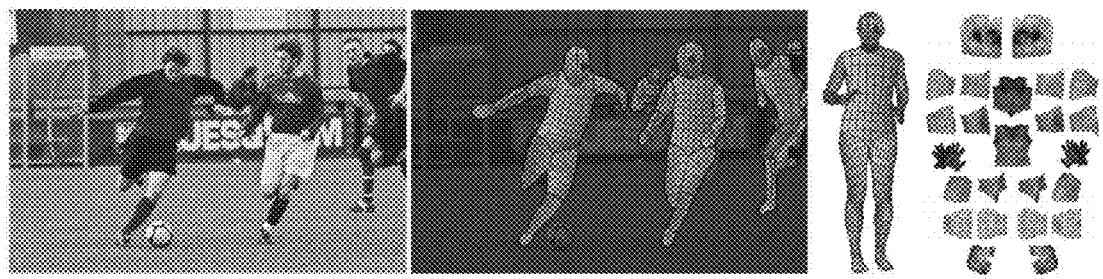

In this embodiment, the image after the texture transfer in step 204 is not complete, and in order to maintain consistency, some parts in the original user image are erased while the texture transfer fails to completely fill these parts, and the image obtained in this way is generally as shown in FIG. 3A. The incomplete image and the corresponding mask are input to a pre-trained image completion network to obtain the completed image. The image completion network may employ an existing generative adversarial network, such as "inpainting".

In some alternative implementations of this embodiment, the method further includes: fusing a result of a clothing analysis on the user image with the completed image to obtain a fused image. Since the ability of the generator of the image completion network is limited, it is difficult to restore the complicated human body parts such as the face and the fingers at the same time as the clothing and the limbs are completed. Therefore, when finally the fusion is performed, the result of the segmentation of the CE2P algorithm will be took into account, and the details such as the face, the hair, and the fingers are extracted from the original image and fused into the image, so that a vivid image can be obtained.

In some alternative implementations of this embodiment, the method further includes: embedding, in combination with information of the human body positioning analysis on the user image, the fused image in step 205 into the original user image for outputting.

FIGS. 3A and 3B are schematic diagrams of an application scenario of the method for a virtual fitting according to an embodiment of the present disclosure. As shown in FIG. 3A, after the positioning, the surface coordinate analysis (as shown in FIG. 3B), and the clothing segmentation are respectively performed on the model picture and the user image, the clothing texture in the model picture is transferred to the user image, and then the effect diagram of the fitting is obtained after the image is completed and fused.

According to the method provided by the above embodiment of the present disclosure, by combining the most advanced densepose algorithm and the CE2P algorithm the image-level virtual fitting is achieved based on the 2D image, and has characteristics of low cost and wild application range. At the same time, in combination with the self-developed completion algorithm for a human body, an image of any resolution can be processed. This solution can be applied to a virtual fitting room of an e-commerce website, which can be experienced by the user without pre-collecting clothing data. Alternatively, this solution can be applied to photo editing software or only used as an entertainment, and has a strong practical value.

Figure 4:
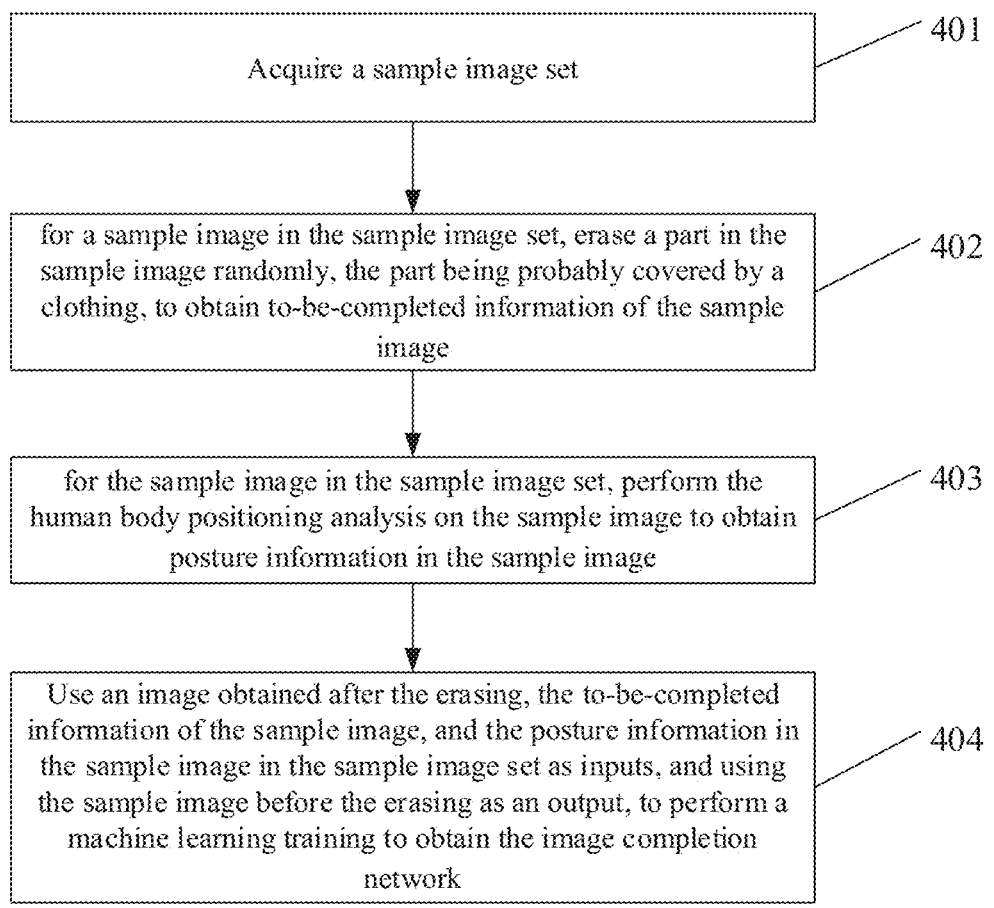
FIG. 4 is a flowchart of a method for training an image completion network of the method for a virtual fitting according to an embodiments of the present disclosure.

Further referring to FIG. 4, FIG. 4 shows a flow 400 of a method for training an image completion network, and the flow 400 of the method for training an image completion network include steps 401 to 404.

Step 401, acquiring a sample image set.

Figure 5:
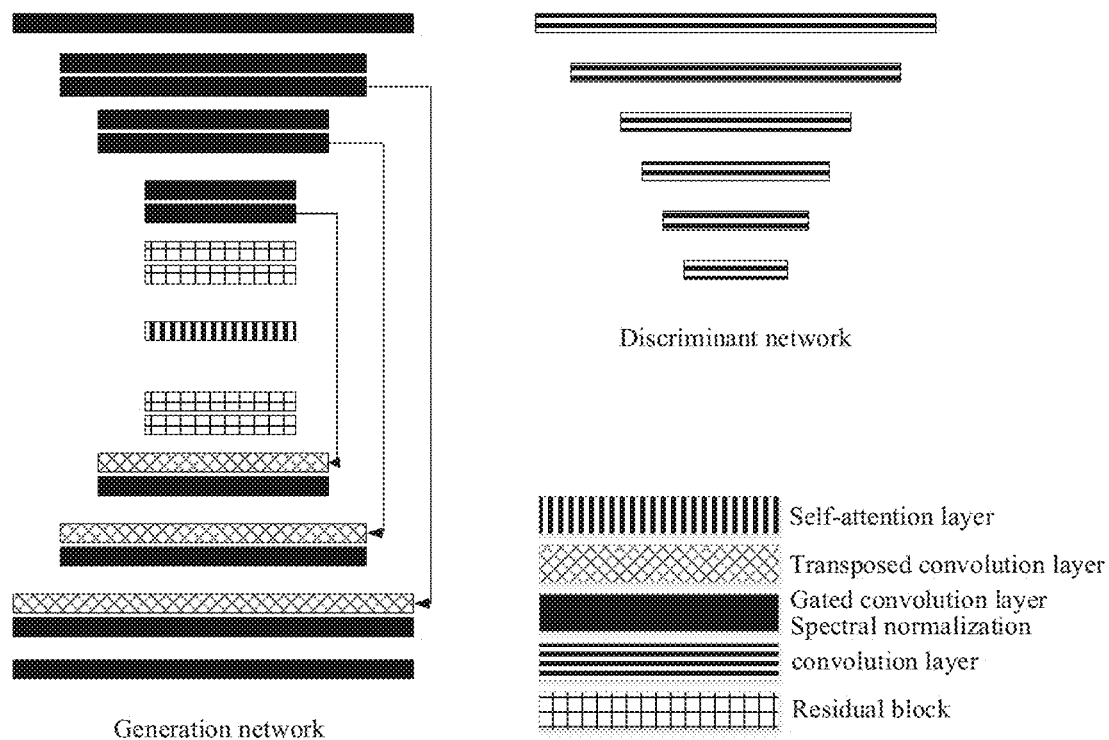
FIG. 5 is a structural network diagram of an image completion network according to an embodiment of the present disclosure.

In this embodiment, in order to train the image completion network for a human body image, model images from a large number of e-commerce websites may be collected as the sample image set. The image completion network generally follows the framework of GAN (Generative Adversarial Networks). The structures of the generation network and the discriminant network are as shown in FIG. 5, are both fully convolution structures, and support any resolution. At the same time, in order to support batch training, all sample images are randomly cut into square inputs of 384×384 pixels during the training.

Step 402, for a sample image in the sample image set, erasing a part in the sample image randomly, the part being probably covered by a piece of clothing, to obtain to-be-completed information of the sample image.

In this embodiment, a part in the sample image that may be probably covered by a piece of clothing is randomly erased to generate "mask".

Step 403, for the sample image in the sample image set, performing human body positioning analysis on the sample image to obtain posture information in the sample image.

In this embodiment, the human body positioning analysis is performed on the sample image by using, for example, the densepose algorithm in step 202, to obtain the posture information in the sample image, and then the analyzed posture of the human body is used as an input to guide the generation of the human body.

Step 404, using an image obtained after the erasing, the to-be-completed information of the sample image, and the posture information in the sample image in the sample image set as inputs, and using the sample image before the erasing as an output, to perform a machine learning training to obtain the image completion network.

In this embodiment, the image completion network may adopt the structure as shown in FIG. 5. The training process is as follows: the sample images are selected from the sample image set, and then the training steps are executed:

1. the erased images of the selected sample images, the to-be-completed information, and the posture information are input into an initial image completion network to obtain the actual output images;
2. the loss values are determined based on the actual output image and the expected output sample images before the erasing;
3. the total loss value is compared with a target value, and whether the training of the initial image completion network is completed is determined based on the comparison result;
4. If the training of the initial image completion network is completed, the initial image completion network is used as the image completion network; and
5. or if the training of the initial image completion network is not completed, the relevant parameters of the initial image completion network are adjusted, sample images are reselected from the sample image set, and the adjusted initial image completion network is used as an initial image completion network to continue to execute the above training steps 1 to 5.

In some alternative implementations of this embodiment, the image completion network includes a generation network and a discriminant network, the generation network includes a gated convolution layer, a residual block, a self-attention layer, and a transposed convolution layer, and the discriminant network includes a spectral normalization convolution layer.

Figure 6:
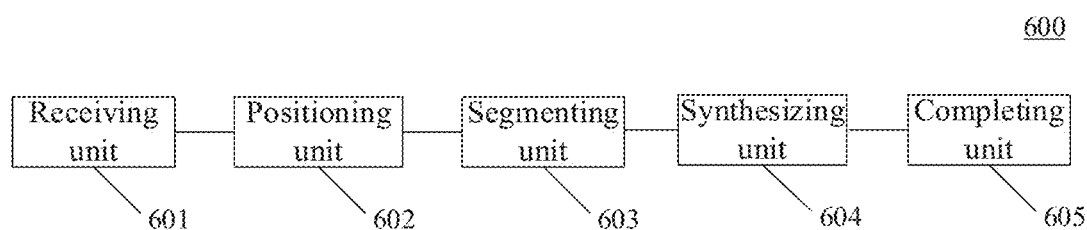
FIG. 6 is a schematic structural diagram of an apparatus for a virtual fitting according to an embodiment of the present disclosure.

Further referring to FIG. 6, as an implementation of the method shown in each of the above figures, an embodiment of the present disclosure provides an apparatus for a visual fitting. The embodiment of the apparatus corresponds to the embodiment of the method shown in FIG. 2, and the apparatus is particularly applicable to various electronic devices.

As shown in FIG. 6, the apparatus 600 for a visual fitting provided by this embodiment includes: a receiving unit 601, a positioning unit 602, a segmenting unit 603, a synthesizing unit 604 and a completing unit 605. The receiving unit 601 is configured to receive a fitting request including a model picture and a user image; the positioning unit 602 is configured to perform human body positioning analysis and surface coordinate analysis on the model picture and the user image respectively; the segmenting unit 603 is configured to perform clothing segmentation on the model picture and the user image respectively; the synthesizing unit 604 is configured to cover, based on results of the clothing segmentation and results of the surface coordinate analysis, pixels corresponding to a piece of clothing in the model picture to corresponding positions in the user image to obtain a synthesized image and to-be-completed information; and the completing unit 605 is configured to input the synthesized image, a result of the human body positioning analysis on the user image and the to-be-completed information into a pre-trained image completion network to obtain a completed image.

In this embodiment, the specific processing of the receiving unit 601, the positioning unit 602, the segmenting unit 603, the synthesizing unit 604 and the completing unit 605 of the apparatus 600 for a visual fitting may be described with reference to steps 201 to 205 in the embodiment corresponding to FIG. 2 respectively.

In some optional implementations of this embodiment, the apparatus 600 further includes a fusing unit (not shown in the accompanying drawings), configured to fuse a result of a clothing analysis on the user image with the completed image to obtain a fused image.

In some optional implementations of this embodiment, the apparatus 600 further includes an output unit (not shown in the accompanying drawings), configured to embed, based on a result of the human body positioning analysis on the user image, the fused image into the original user image for outputting.

In some optional implementations of this embodiment, the fitting request further includes a type of a target piece of clothing, and the apparatus 600 further includes an erasing unit (not shown in the accompanying drawings), configured to: determine, based on the type of the target piece of clothing and a result of the human body positioning analysis on the user image, a to-be-erased area in the user image, before covering the pixels corresponding to the piece of clothing in the model picture to the corresponding position in the user image; and erase, based on the to-be-erased area, a part in the user image, the part being probably covered by the target piece of clothing.

In some optional implementations of this embodiment, the apparatus 600 further includes a training unit (not shown in the accompanying drawings), configured to: acquire a sample image set; for a sample image in the sample image set, erase a part in the sample image randomly, the part being probably covered by a piece of clothing, to obtain to-be-completed information of the sample image; for the sample image in the sample image set, perform the human body positioning analysis on the sample image to obtain posture information in the sample image; and use an image obtained after the erasing, the to-be-completed information in the sample image, and the posture information of the sample image in the sample image set as inputs, and use the sample image before the erasing as an output, to perform a machine learning training to obtain the image completion network.

In some optional implementations of this embodiment, the image completion network includes: a generation network and a discriminant network, the generation network includes a gated convolution layer, a residual block, a self-attention layer, and a transposed convolution layer, and the discriminant network includes a spectral normalization convolution layer.

Figure 7:
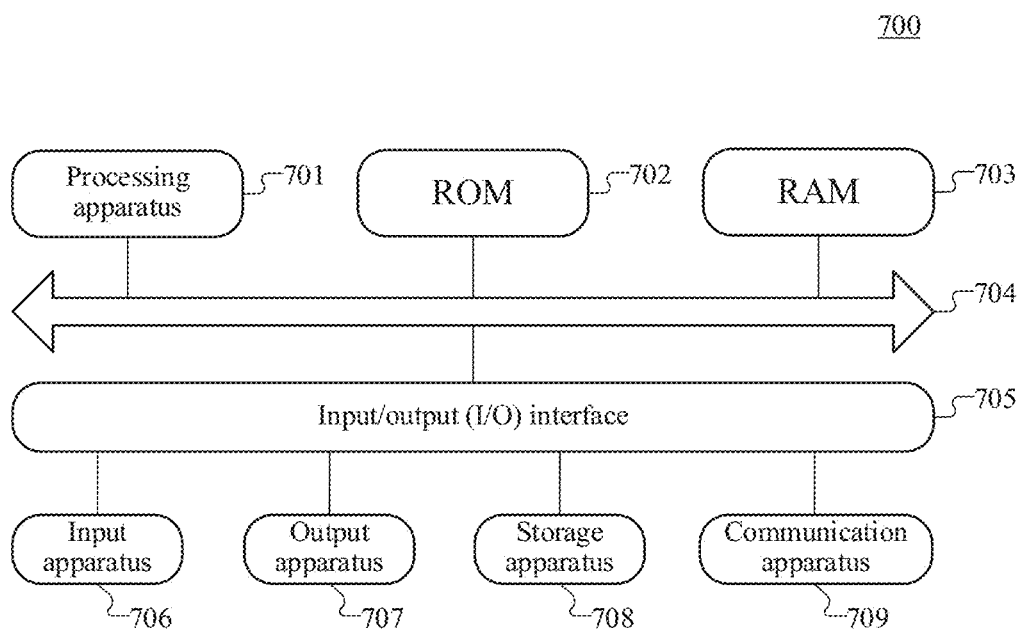
FIG. 7 is a schematic structural diagram of a computer system of an electronic device adapted to implement embodiments of the present disclosure.

Referring to FIG. 7, FIG. 7 shows a schematic structural diagram of an electronic device 700 (such as the server in FIG. 1) adapted to implement embodiments of the present disclosure. The server shown in FIG. 7 is merely an example and should not be construed as limiting the functionality and usage scope of embodiments of the present disclosure.

As shown in FIG. 7, the electronic device 700 may include a processing apparatus 701 (such as a central processing unit and a graphic processor), which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

Generally, the following apparatuses are connected to the I/O interface 705: an input apparatus 706 including a touch screen, a touchpad, a keyboard, a mouse a camera, a microphone, an accelerometer, a gyroscope and the like; an output apparatus 707 including a liquid crystal display (LCD), a speaker, a vibrator and the like; a storage apparatus 708 including a magnetic tap, a hard disk and the like; and a communication apparatus 709. The communication apparatus 709 may allow the electronic device 700 to perform wireless or wired communication with other devices to exchange data. Although FIG. 7 shows the electronic device 700 having various apparatuses, it should be appreciated that it is not required to implement or provide all the shown apparatuses, and it may alternatively be implemented or provided with more or fewer apparatuses. Each block shown in FIG. 7 may represent one apparatus or multiple apparatuses according to requirements.

In particular, according to some embodiments of the present disclosure, the process described above with reference to the flowchart may be implemented as a computer software program. For example, some embodiments of the present disclosure include a computer program product, which includes a computer program carried on a computer readable medium. The computer program includes program codes for executing the method shown in the flowchart. In such an embodiment, the computer program may be downloaded and installed from a network via the communication apparatus 709, or may be installed from the storage apparatus 708, or may be installed from the ROM 702. The computer program, when executed by the processing apparatus 701, implements the above functionalities as defined by the method of some embodiments of the present disclosure. It should be noted that the computer readable medium described by some embodiments of the present disclosure may be computer readable signal medium or computer readable storage medium or any combination of the above two. The computer readable storage medium may be, but is not limited to: an electric, magnetic, optical, electromagnetic, infrared, or semiconductor system, an apparatus, an element, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by or in combination with an instruction execution system, an apparatus or an element. In some embodiments of the present disclosure, the computer readable signal medium may include a data signal in the base band or propagating as a part of a carrier, in which computer readable program codes are carried. The propagating signal may be various forms, including but not limited to: an electromagnetic signal, an optical signal or any suitable combination of the above. The computer readable signal medium may be any computer readable medium except for the computer readable storage medium. The computer readable signal medium is capable of transmitting, propagating or transferring programs for use by or in combination with an instruction execution system, an apparatus or an element. The program codes contained on the computer readable medium may be transmitted with any suitable medium including but not limited to: a wire, an optical cable, RF (Radio Frequency), or any suitable combination of the above.

The above computer readable medium may be included in the electronic device; or may alternatively be present alone and not assembled into the electronic device. The computer readable medium carries one or more programs that, when executed by the electronic device, cause the electronic device to: receive a fitting request including a model picture and a user image; perform human body positioning analysis and surface coordinate analysis on the model picture and the user image respectively; perform clothing segmentation on the model picture and the user image respectively; cover, based on results of the clothing segmentation and results of the surface coordinate analysis, pixels corresponding to a piece of clothing in the model picture to corresponding positions in the user image to obtain a synthesized image and to-be-completed information; and input the synthesized image, a result of the human body positioning analysis on the user image and the to-be-completed information into a pre-trained image completion network to obtain a completed image.

A computer program code for executing operations of some embodiments of the present disclosure may be written in one or more programming languages or a combination thereof. The programming languages include object-oriented programming languages, such as Java, Smalltalk or C++, and also include conventional procedural programming languages, such as "C" language or similar programming languages. The program code may be completely executed on a user computer, partially executed on a user computer, executed as a separate software package, partially executed on a user computer and partially executed on a remote computer, or completely executed on a remote computer or server. In a case involving a remote computer, the remote computer may be connected to a user computer through any kind of network, including a local area network (LAN) or a wide area network (WAN), or may be connected to an external computer (for example, connected through Internet using an Internet service provider).

The flowcharts and block diagrams in the accompanying drawings show architectures, functions and operations that may be implemented according to the systems, methods and computer program products of the various embodiments of the present disclosure. In this regard, each of the blocks in the flowcharts or block diagrams may represent a module, a program segment, or a code portion, the module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor, including a receiving unit, a positioning unit, a segmenting unit, a synthesizing unit, and a completing unit, where the names of these units do not constitute a limitation to such units themselves in some cases. For example, the receiving unit may alternatively be described as "a unit of receiving a fitting request including a model picture and a user image".

The above description only provides an explanation of the preferred embodiments of the present disclosure and the technical principles used. It should be appreciated by those skilled in the art that the inventive scope involved in the present disclosure is not limited to the technical solutions formed by the particular combinations of the above technical features. The inventive scope should also cover other technical solutions formed by any combinations of the above technical features or equivalent features thereof without departing from the concept of the present disclosure, such as technical solutions formed through the above features and technical features having similar functions provided (or not provided) in the present disclosure being replaced with each other.

What is claimed is:

1. A method for virtual fitting, comprising:
   receiving a fitting request comprising a model picture and a user image;
   performing human body positioning analysis and surface coordinate analysis on the model picture and the user image respectively;
   performing clothing segmentation on the model picture and the user image respectively;
   covering, based on results of the clothing segmentation and results of the surface coordinate analysis, pixels corresponding to a piece of clothing in the model picture to corresponding positions in the user image to obtain a synthesized image and to-be-completed information; and
   inputting the synthesized image, a result of the human body positioning analysis on the user image and the to-be-completed information into a pre-trained image completion network to obtain a completed image;
   wherein the image completion network is trained through following steps of:
   acquiring a sample image set;
   for a sample image in the sample image set, erasing a part in the sample image randomly, the part being probably covered by a piece of clothing, to obtain to-be-completed information of the sample image;
   for the sample image in the sample image set, performing the human body positioning analysis on the sample image to obtain posture information in the sample image; and
   using an image obtained after the erasing, the to-be-completed information of the sample image, and the posture information in the sample image in the sample image set as inputs, and using the sample image before the erasing as an output, to perform a machine learning training to obtain the image completion network.

2. The method according to claim 1, wherein the method further comprises:
   fusing a result of clothing analysis on the user image with the completed image to obtain a fused image.

3. The method according to claim 2, wherein the method further comprises:
   embedding, based on a result of the human body positioning analysis on the user image, the fused image into the original user image for outputting.

4. The method according to claim 1, wherein the fitting request further comprises a type of a target piece of clothing, and before the covering pixels corresponding to a piece of clothing in the model picture to corresponding positions in the user image, the method further comprises:

determining, based on the type of the target piece of clothing and a result of the human body positioning analysis on the user image, a to-be-erased area in the user image; and erasing, based on the to-be-erased area, a part in the user image, the part being probably covered by the target piece of clothing.

5. The method according to claim 1, wherein the image completion network comprises: a generation network and a discriminant network, the generation network comprises a gated convolution layer, a residual block, a self-attention layer, and a transposed convolution layer, and the discriminant network comprises a spectral normalization convolution layer.

6. An apparatus for visual fitting, comprising:

at least one processor; and a memory, wherein the memory stores instructions executable by the at least one processor, and the instructions, when executed by the at least one processor, cause the at least one processor to perform operations comprising:

receiving a fitting request comprising a model picture and a user image;

performing human body positioning analysis and surface coordinate analysis on the model picture and the user image respectively;

performing clothing segmentation on the model picture and the user image respectively;

covering, based on results of the clothing segmentation and results of the surface coordinate analysis, pixels corresponding to a piece of clothing in the model picture to corresponding positions in the user image to obtain a synthesized image and to-be-completed information; and inputting the synthesized image, a result of the human body positioning analysis on the user image and the to-be-completed information into a pre-trained image completion network to obtain a completed image;

wherein the image completion network is trained through following steps of:

acquiring a sample image set;

for a sample image in the sample image set, erasing a part in the sample image randomly, the part being probably covered by a piece of clothing, to obtain to-be-completed information of the sample image;

for the sample image in the sample image set, performing the human body positioning analysis on the sample image to obtain posture information in the sample image; and using an image obtained after the erasing, the to-be-completed information of the sample image, and the posture information in the sample image in the sample image set as inputs, and use the sample image before the erasing as an output, to perform a machine learning training to obtain the image completion network.

7. The apparatus according to claim 6, wherein the operations further comprise:

fusing a result of clothing analysis on the user image with the completed image to obtain a fused image.

8. The apparatus according to claim 7, wherein the operations further comprise:

embedding, based on a result of the human body positioning analysis on the user image, the fused image into the original user image for outputting.

9. The apparatus according to claim 6, wherein the fitting request further comprises a type of a target piece of clothing, and before the covering pixels corresponding to a piece of clothing in the model picture to corresponding positions in the user image, the operations further comprise:

determining, based on the type of the target piece of clothing and a result of the human body positioning analysis on the user image, a to-be-erased area in the user image; and erasing, based on the to-be-erased area, a part in the user image, the part being probably covered by the target piece of clothing.

10. The apparatus according to claim 6, wherein the image completion network comprises: a generation network and a discriminant network, the generation network comprises a gated convolution layer, a residual block, a self-attention layer, and a transposed convolution layer, and the discriminant network comprises a spectral normalization convolution layer.

11. A non-transitory computer-readable medium storing a computer program thereon, wherein the program, when executed by a processor, cause the processor to implement operations comprising:

receiving a fitting request comprising a model picture and a user image;

performing human body positioning analysis and surface coordinate analysis on the model picture and the user image respectively;

performing clothing segmentation on the model picture and the user image respectively;

covering, based on results of the clothing segmentation and results of the surface coordinate analysis, pixels corresponding to a piece of clothing in the model picture to corresponding positions in the user image to obtain a synthesized image and to-be-completed information; and inputting the synthesized image, a result of the human body positioning analysis on the user image and the to-be-completed information into a pre-trained image completion network to obtain a completed image;

wherein the image completion network is trained through following steps of:

acquiring a sample image set;

for a sample image in the sample image set, erasing a part in the sample image randomly, the part being probably covered by a piece of clothing, to obtain to-be-completed information of the sample image;

for the sample image in the sample image set, performing the human body positioning analysis on the sample image to obtain posture information in the sample image; and using an image obtained after the erasing, the to-be-completed information of the sample image, and the posture information in the sample image in the sample image set as inputs, and use the sample image before the erasing as an output, to perform a machine learning training to obtain the image completion network.

12. The non-transitory computer-readable medium according to claim 11, wherein the operations further comprise:

fusing a result of clothing analysis on the user image with the completed image to obtain a fused image.

13. The non-transitory computer-readable medium according to claim 12, wherein the operations further comprise:

embedding, based on a result of the human body positioning analysis on the user image, the fused image into the original user image for outputting.

14. The non-transitory computer-readable medium according to claim 11, wherein the fitting request further comprises a type of a target piece of clothing, and before the covering pixels corresponding to a piece of clothing in the model picture to corresponding positions in the user image, the operations further comprise:

determining, based on the type of the target piece of clothing and a result of the human body positioning analysis on the user image, a to-be-erased area in the user image; and erasing, based on the to-be-erased area, a part in the user image, the part being probably covered by the target piece of clothing.

15. The non-transitory computer-readable medium according to claim 11, wherein the image completion network comprises: a generation network and a discriminant network, the generation network comprises a gated convolution layer, a residual block, a self-attention layer, and a transposed convolution layer, and the discriminant network comprises a spectral normalization convolution layer.

\* \* \* \* \*